(No Model.)

E. E. PAGE.
Lactometer.

No. 230,330.  Patented July 20, 1880.

WITNESSES
John A. Ellis
Frank J. Masi

INVENTOR
E. E. Page,
by E. W. Anderson
his ATTORNEY

N. PETERS, PHOTO-LITHOGRAPHER, WASHINGTON, D. C.

UNITED STATES PATENT OFFICE.

ERASMUS E. PAGE, OF MARSHALLTOWN, IOWA.

LACTOMETER.

SPECIFICATION forming part of Letters Patent No. 230,330, dated July 20, 1880.

Application filed May 26, 1880. (No model.)

*To all whom it may concern:*

Be it known that I, E. E. PAGE, of Marshalltown, in the county of Marshall and State of Iowa, have invented a new and valuable Improvement in Graduated Milk-Testers; and I do hereby declare that the following is a full, clear, and exact description of the construction and operation of the same, reference being had to the annexed drawings, making a part of this specification, and to the letters and figures of reference marked thereon.

Figure 1:
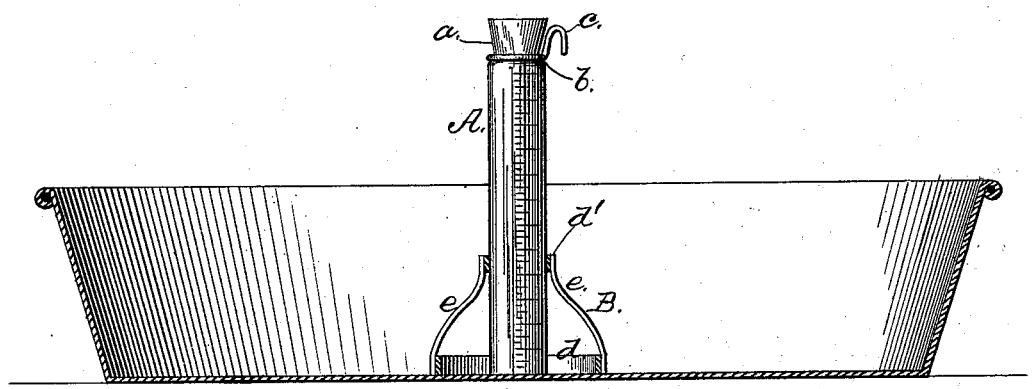
Figure 2:
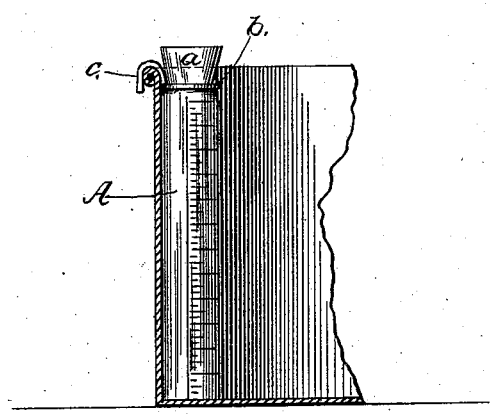

Figure 1 of the drawings is a representation of a side view of my improved cream-tester applied to a shallow pan, and Fig. 2 is a like view of the same applied to a deep one.

This invention has relation to improvements in devices for testing and ascertaining the quantity of cream formed on milk; and the nature of the invention consists in an open-ended transparent tube suitably graduated and having proper support to hold it upright in a vessel containing the milk, as will be hereinafter more fully set forth.

In the annexed drawings, the letter A designates a glass tube open at both ends, and having a rather narrow bore. This vessel is graduated for inches and fractions thereof upon its outside, and its upper end is preferably reduced in size, as indicated at $a$, in order to the more convenient stopping up thereof with the thumb.

Passing around the neck $a$ of the vessel is a wire, $b$, properly secured and terminating in a hook, $c$. In testing in deep pans hook $c$ is engaged with the edge thereof, while in shallow pans I use a support, B, consisting of a wide annular base, $d$, and a narrow concentric ring, $d'$, connected thereto by means of the metallic strips $e$, and fitting snugly around the tube.

The tube is placed upright in the milk immediately after it is strained, and allowed to remain until the cream has fully formed. Its upper end is then tightly closed, usually by the thumb, and the tube raised vertically out of the milk, when it will be found to contain a small section of milk and cream. The scale on the tube will fairly indicate the quantity and thickness of the cream. Sometimes the graduated tube may be sufficiently broad at its bottom to be self-supporting, and instead of being wholly of glass may be constructed of other materials, with a glass-covered slot in its side.

What I claim as new, and desire to secure by Letters Patent, is—

In a cream-tester, the open-ended transparent graduated tube A, having a support to hold it upright in a vessel of milk, substantially as specified.

In testimony that I claim the above I have hereunto subscribed my name in the presence of two witnesses.

ERASMUS E. PAGE.

Witnesses:
GEO. A. McINTYRE,
GEO. NEIL.